US012645928B2

(12) United States Patent
Gao et al.

(10) Patent No.: US 12,645,928 B2
(45) Date of Patent: Jun. 2, 2026

(54) DATA PROCESSING CIRCUIT, DATA PROCESSING METHOD, AND RELATED PRODUCTS

(71) Applicant: Cambricon (Xi'an) Semiconductor Co., Ltd., Xi'an (CN)

(72) Inventors: Yufeng Gao, Xi'an (CN); Shibing Zhu, Xi'an (CN); Haoyuan He, Xi'an (CN)

(73) Assignee: CAMBRICON (XI'AN) SEMICONDUCTOR CO., LTD., Xi'an City (CN)

( * ) Notice: Subject to any disclaimer, the term of this patent is extended or adjusted under 35 U.S.C. 154(b) by 529 days.

(21) Appl. No.: 18/257,723

(22) PCT Filed: Sep. 23, 2021

(86) PCT No.: PCT/CN2021/119946
§ 371 (c)(1),
(2) Date: Jun. 15, 2023

(87) PCT Pub. No.: WO2022/134688
PCT Pub. Date: Jun. 30, 2022

(65) Prior Publication Data
US 2024/0070445 A1 Feb. 29, 2024

(30) Foreign Application Priority Data
Dec. 25, 2020 (CN) .......................... 202011566159.1

(51) Int. Cl.
*G06F 7/00* (2006.01)
*G06F 9/38* (2018.01)
(Continued)

(52) U.S. Cl.
CPC .............. *G06N 3/063* (2013.01); *G06F 9/38* (2013.01); *G06N 3/084* (2013.01)

(58) Field of Classification Search
CPC ........... G06N 3/063; G06N 3/084; G06F 9/38
(Continued)

(56) References Cited

U.S. PATENT DOCUMENTS

2021/0081201 A1* 3/2021 Maiyuran ........... G06F 9/30101

FOREIGN PATENT DOCUMENTS

| CN | 107909148 A | 4/2018 |
| CN | 109740739 A | 5/2019 |

OTHER PUBLICATIONS

PCT/CN2021/119946—International Search Report And Written Opinion mailed on Dec. 29, 2021, 17 pages.

* cited by examiner

*Primary Examiner* — Isaac M Woo
(74) *Attorney, Agent, or Firm* — Getech Law LLC; Jun Ye

(57) ABSTRACT

The present disclosure discloses a data processing circuit, a data processing method, and related products. The data processing circuit is implemented as a computing apparatus included in a combined processing apparatus. The combined processing apparatus further includes an interface apparatus and other processing apparatus. The computing apparatus interacts with other processing apparatus to jointly complete a user specified computation operation. The combined processing apparatus further includes a storage apparatus. The storage apparatus is connected to the computing apparatus and other processing apparatus, respectively. The storage apparatus is used to store data of the computing apparatus and other processing apparatus. The solution disclosed in the present disclosure provides hardware implementation for operations related to structured sparsity, which can simplify processing and improve processing efficiency of a machine.

10 Claims, 6 Drawing Sheets

(51) Int. Cl.
*G06N 3/063* (2023.01)
*G06N 3/084* (2023.01)

(58) Field of Classification Search
USPC .................................... 707/600–899; 706/25
See application file for complete search history.

DATA PROCESSING CIRCUIT, DATA PROCESSING METHOD, AND RELATED PRODUCTS

CROSS REFERENCE OF RELATED APPLICATION

The present application is a 371 of international Application PCT/CN2021/119946, filed Sep. 23, 2021, which claims priority to Chinese Patent Application No. 2020115661591 with the title of "DATA PROCESSING CIRCUIT, DATA PROCESSING METHOD, AND RELATED PRODUCTS" filed on Dec. 25, 2020. The contents of the applications are incorporated herein by reference in their entireties.

TECHNICAL FIELD

The present disclosure generally relates to a field of processor. More specifically, the present disclosure relates to a data processing circuit, a data processing method using the data processing circuit, a chip, and a board card.

BACKGROUND

In recent years, with the rapid development of deep learning, the algorithm performance in a range of fields such as computer vision and natural language processing has made leaps and bounds. However, a deep learning algorithm is a computing-intensive and storage-intensive tool. With the increasing complexity of information processing, the requirement for real-time performance and accuracy of algorithm is increasing. A neural network is often designed deeper and deeper, requiring an increasing amount of computation and storage space, so that it is difficult for the existing artificial intelligence technology based on deep learning to be directly applied to mobile phones, satellites or embedded devices with limited hardware resources.

Therefore, the compression, acceleration, and optimization of a deep neural network model become extremely important. A large number of studies have tried to reduce the demand of computation and storage space of the neural network without affecting the accuracy of the model, which is of great significance to the engineering application of deep learning technology on embedded and mobile terminals. Sparsity is just one of methods of model lightweighting.

Sparsity of network parameters is to reduce redundant components in a larger network by appropriate methods, so as to reduce the demand of computation and storage space of the network. However, existing hardware and/or instruction sets cannot efficiently support sparsity.

SUMMARY

In order to at least partially solve one or more technical problems mentioned in the background art, the solution of the present disclosure provides a data processing circuit, a data processing method, a chip, and a board card.

A first aspect of the present disclosure provides a data processing circuit including a control circuit, a storage circuit and an operation circuit. The control circuit is configured to control the storage circuit and the operation circuit to perform structured sparsity on one dimension of at least one piece of tensor data; the storage circuit is configured to store information, where the information at least includes information before and/or after the sparsity; and the operation circuit is configured to perform the structured sparsity on one dimension of the tensor data under the control of the control circuit.

A second aspect of the present disclosure provides a chip including the data processing circuit provided in any of embodiments of the first aspect of the present disclosure.

A third aspect of the present disclosure provides a board card including the chip provided in any of embodiments of the second aspect of the present disclosure.

A fourth aspect of the present disclosure provides a data processing method using the data processing circuit provided in any of embodiments of the first aspect of the present disclosure.

By the data processing circuit, the data processing method using the data processing circuit, the chip, and the board card provided above, the embodiment of the present disclosure provides a hardware circuit that supports the structured sparsity on data, and the hardware circuit may perform the structured sparsity on one dimension of the tensor data. In some embodiments, the data processing circuit of the embodiments of the present disclosure may support the structured sparsity in the inference and training process of the neural network, and the dimension for sparsity is an input channel dimension. By providing dedicated hardware to perform structured sparsity, processing may be simplified, and then the processing efficiency of a machine may be improved.

BRIEF DESCRIPTION OF DRAWINGS

By reading the following detailed description with reference to accompanying drawings, the above-mentioned and other objects, features and technical effects of the exemplary embodiments of the present disclosure will become easier to understand. In the accompanying drawings, several embodiments of the present disclosure are shown in an exemplary but not a restrictive manner, and the same or corresponding reference numerals indicate the same or corresponding parts of the embodiments.

DETAILED DESCRIPTION OF EMBODIMENTS

Technical solutions in embodiments of the present disclosure will be described clearly and completely hereinafter with reference to accompanied drawings in the embodiments of the present disclosure. Obviously, embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" in the claims, the specification, and drawings are used for distinguishing different objects rather than describing a specific order. It should be understood that terms "including" and "comprising" used in the specification and the claims indicate the presence of a feature, an entity, a step, an operation, an element, and/or an assembly, but do not exclude the existence or addition of one or more other features, entities, steps, operations, elements, components, and/or collections thereof.

It should also be understood that the terms used in the specification of the present disclosure are merely intended to describe specific embodiments rather than to limit the present disclosure. As being used in the specification and the claims of the disclosure, unless the context clearly indicates otherwise, singular forms "a", "an", and "the" are intended to include plural forms. It should also be understood that a term "and/or" used in the specification and the claims refers to any and all possible combinations of one or more of relevant listed items and includes these combinations.

As being used in this specification and the claims, a term "if" may be interpreted as "when", or "once", or "in response to a determination" or "in response to a case where something is detected" depending on the context.

The specific embodiments of the present disclosure are described in details below in reference to the drawings.

Figure 1:
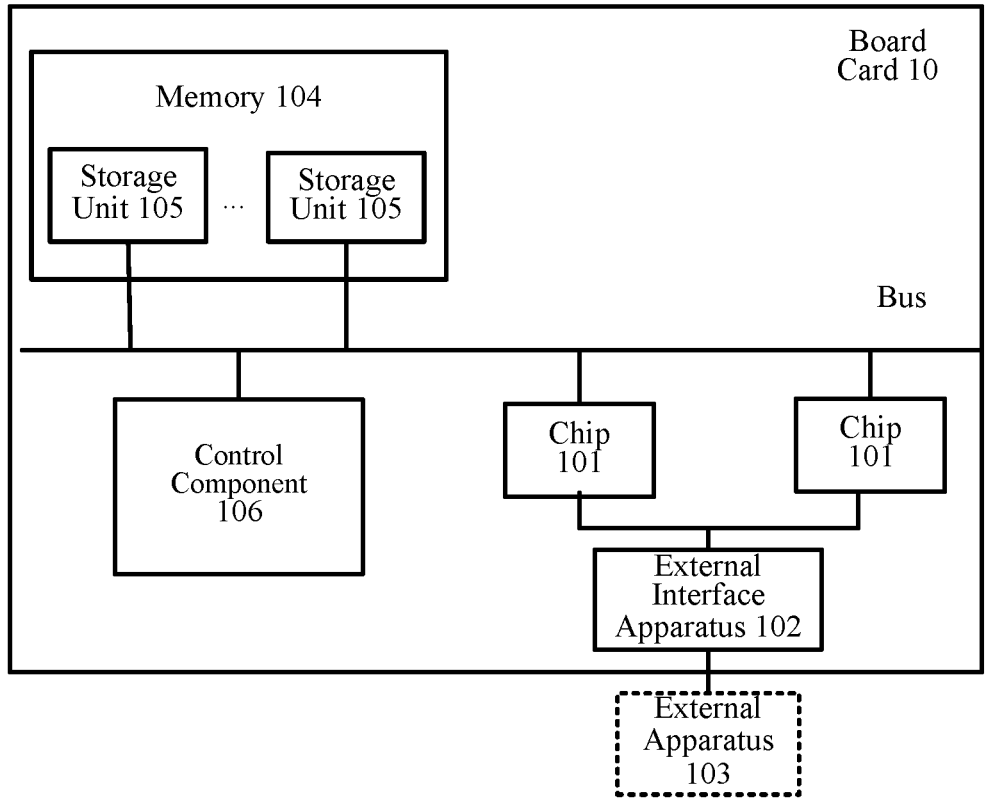
FIG. 1 is a structural diagram of a board card according to an embodiment of the present disclosure.

FIG. 1 is a structural diagram of a board card 10 according to an embodiment of the present disclosure. As shown in FIG. 1, the board card 10 includes a chip 101, which is a system-on-chip (SoC), or it is called an on-chip system. The chip 101 is integrated with one or more combined processing apparatuses, where the combined processing apparatus is an artificial intelligence computing unit used to support various types of deep learning and machine learning algorithms to meet the intelligent processing requirements in complex scenarios in the fields of computer vision, speech, natural language processing, data mining, and the like. In particular, a deep learning technology is widely applied in the field of cloud intelligence. A prominent feature of cloud intelligence application is the large amount of input data, which has high requirements on the storage capacity and computing power of a platform. The board card 10 of this embodiment is suitable for the cloud intelligence application, with huge off-chip storage, huge on-chip storage, and powerful computing capacity.

The chip 101 is connected to an external apparatus 103 through an external interface apparatus 102. The external apparatus 103 may be, such as a server, a computer, a camera, a monitor, a mouse, a keyboard, a network card, or a WIFI interface. To-be-processed data may be transferred from the external apparatus 103 to the chip 101 through the external interface apparatus 102. A computation result of the chip 101 may also be transferred by the external interface apparatus 102 to the external apparatus 103. According to different application scenarios, the external interface apparatus 102 may have different interface forms, such as a peripheral component interconnect express (PCIe) interface.

The board card 10 further includes a memory 104 used for storing data, which includes one or a plurality of storage units 105. The memory 104 may connect to and transfer data with a control component 106 and the chip 101 through a bus. The control component 106 in the board card 10 may be configured to regulate and control a state of the chip 101. Therefore, in an application scenario, the control component 106 may include an MCU (Micro Controller Unit).

Figure 2:
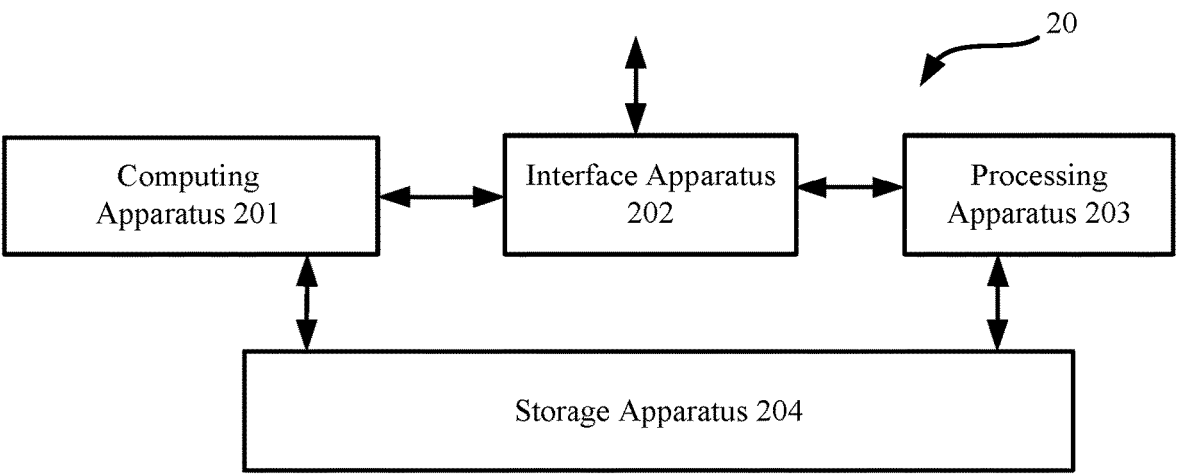
FIG. 2 is a structural diagram of a combined processing apparatus according to an embodiment of the present disclosure.

FIG. 2 is a structural diagram of a combined processing apparatus in a chip 101 according to an embodiment of the present disclosure. As shown in FIG. 2, a combined processing apparatus 20 may include a computing apparatus 201, an interface apparatus 202, a processing apparatus 203, and a storage apparatus 204.

The computing apparatus 201 is configured to perform user-specified operations and is primarily implemented as a single-core artificial intelligence processor or a multi-core artificial intelligence processor to perform a deep learning computation or a machine learning computation. The computing apparatus 201 may interact with the processing apparatus 203 through the interface apparatus 202 to jointly complete the user-specified operations.

The interface apparatus 202 is used to transfer data and control instructions between the computing apparatus 201 and the processing apparatus 203. For example, the computing apparatus 201 may obtain input data from the processing apparatus 203 via the interface apparatus 202, and write the input data to an on-chip storage unit of the computing apparatus 201. Further, the computing apparatus 201 may obtain a control instruction from the processing apparatus 203 via the interface apparatus 202, and write the control instruction to an on-chip control cache of the computing apparatus 201. Alternatively or optionally, the interface apparatus 202 may read data in the storage apparatus of the computing apparatus 201 and then transfer the data to the processing apparatus 203.

The processing apparatus 203 serves as a general-purpose processing apparatus, and performs basic controls that include, but are not limited to, data moving, and the starting and/or stopping of the computing apparatus 201. According to different implementations, the processing apparatus 203 may be one or more kinds of general-purpose and/or special-purpose processors, including a CPU (central processing unit), a GPU (graphics processing unit), and the like. These processors include but are not limited to a DSP (digital signal processor), an ASIC (application specific integrated circuit), an FPGA (field-programmable gate array), or other programmable logic devices, discrete gate or transistor logic devices, discrete hardware components, and the like. The number of the processors may be determined according to actual requirements. As described above, the computing apparatus 201 of the present disclosure may be regarded as having a single-core structure or an isomorphic multi-core structure. However, when considered together, both the computing apparatus 201 and the processing apparatus 203 may be regarded as forming a heterogeneous multi-core structure.

The storage apparatus 204 is used for storing to-be-processed data, which may be a DRAM (Dynamic Random Access Memory), and the storage apparatus 204 is a DDR (Double Data Rate) memory. The storage apparatus 204 is typically 16G or larger in size, and is used for storing data from the computing apparatus 201 and/or the processing apparatus 203.

Figure 3:
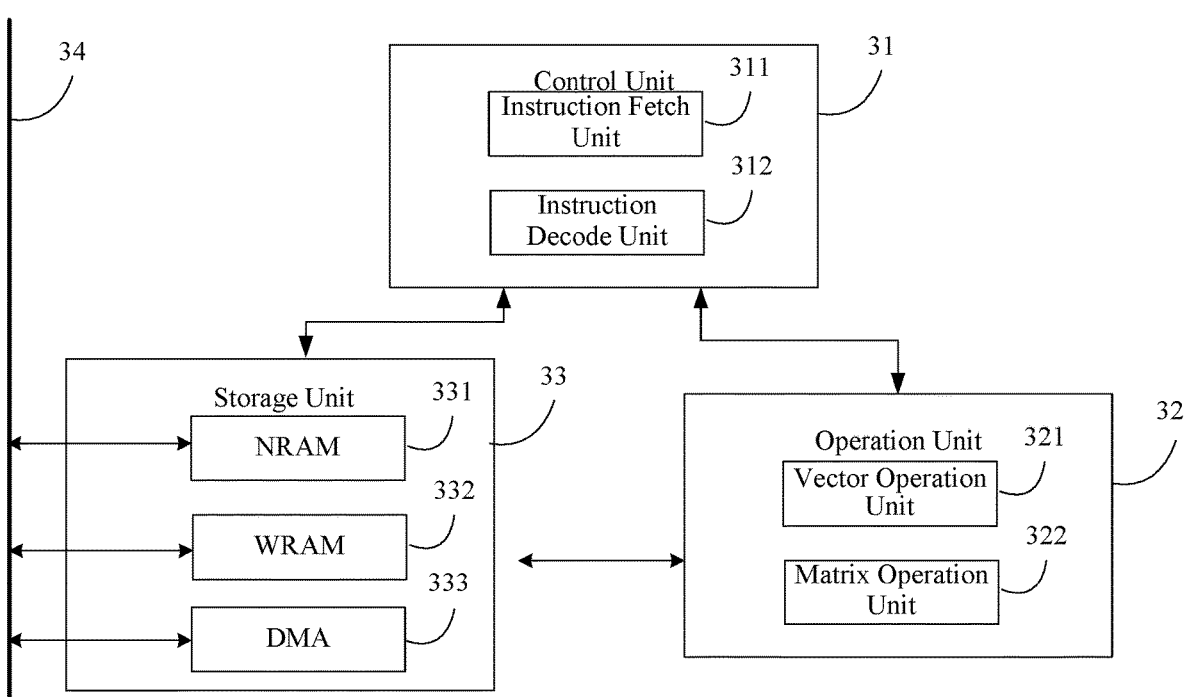
FIG. 3 is a schematic diagram of an internal structure of a processor core of a single-core or multi-core computing apparatus according to an embodiment of the present disclosure.

FIG. 3 is a schematic diagram of an internal structure of a processor core of a computing apparatus 201 when it is a single-core or multi-core computing apparatus. The computing apparatus 301 is configured to process input data in the fields of computer vision, speech, natural language, data mining, and the like. The computing apparatus 301 includes three units, which are a control unit 31, an operation unit 32, and a storage unit 33.

The control unit 31 is configured to coordinate and control work of the operation unit 32 and the storage unit 33 to finish a deep learning task. The control unit 31 includes an IFU (instruction fetch unit) 311 and an IDU (instruction decode unit) 312. The instruction fetch unit 311 is configured to acquire an instruction from the processing apparatus 203. The instruction decode unit 312 is configured to decode the instruction acquired and send a decoding result as control information to the operation unit 32 and the storage unit 33.

The operation unit 32 includes a vector operation unit 321 and a matrix operation unit 322. The vector operation unit 321 is used to perform a vector operation, and may support complex operations such as vector multiplication, addition, and nonlinear transformation. The matrix operation unit 322 is responsible for the core computation of the deep learning algorithm, i.e., matrix multiplication and convolution.

The storage unit 33 is used to store or move relevant data and includes an NRAM (neuron RAM) 331, a WRAM (weight RAM) 332, and a DMA (direct memory access) 333. The NRAM 331 is used to store an input neuron, an output neuron and an intermediate result after computation; the WRAM 332 is used to store a convolution kernel of a deep learning network, i.e., a weight; and the DMA 333 is connected to the DRAM 204 through a bus 34, and is responsible for data transfer between the computing apparatus 301 and the DRAM 204.

Based on the aforementioned hardware environment, an embodiment of the present disclosure provides a data processing circuit that supports structured sparsity on data. By providing a hardware solution for structured sparsity, various processes related to structured sparsity may be simplified and accelerated.

Figure 4:
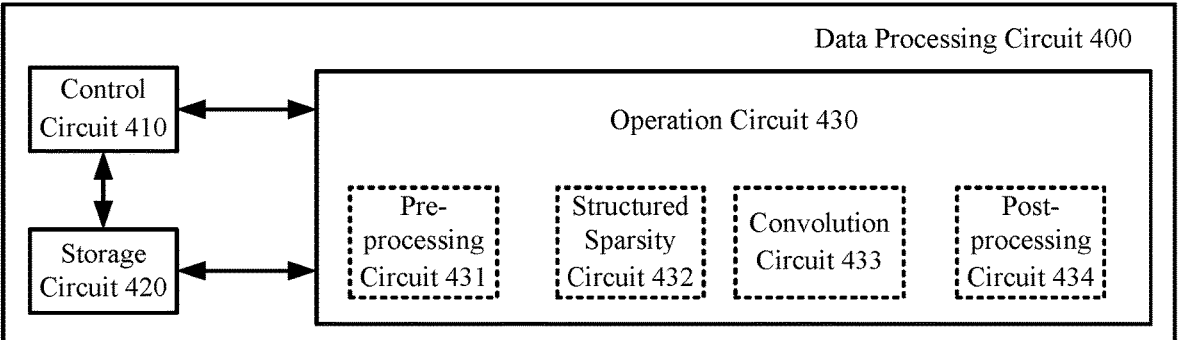
FIG. 4 is a structural block diagram of a data processing circuit according to an embodiment of the present disclosure.

FIG. 4 is a structural block diagram of a data processing circuit 400 according to an embodiment of the present disclosure. The data processing circuit 400 may be implemented, for example, in the computing apparatus 201 of FIG. 2. As shown in the figure, the data processing circuit 400 may include a control circuit 410, a storage circuit 420, and an operation circuit 430.

A function of the control circuit 410 may be similar to that of the control unit 314 in FIG. 3. For example, the control circuit 410 may include, such as an instruction fetch unit configured to acquire an instruction from, such as the processing apparatus 203 in FIG. 2; and the control circuit 410 may also include an instruction decode unit configured to decode the instruction acquired and send a decoding result as control information to the operation circuit 430 and the storage circuit 420.

In an embodiment, the control circuit 410 may be configured to control the storage circuit 420 and the operation circuit 430 to perform structured sparsity on one dimension of at least one piece of tensor data.

The storage circuit 420 may be configured to store information before and/or after sparsity. In an embodiment, data to be structurally sparsed may be data in the neural network, such as weights, neurons, and the like. In this embodiment, the storage circuit may be, such as the WRAM 332 and the NRAM 331 in FIG. 3.

The operation circuit 430 may be configured to perform the structured sparsity on one dimension of the above-mentioned tensor data under the control of the control circuit 410.

In some embodiments, the operation circuit 430 may include a structured sparsity circuit 432, which may be configured to select n data elements from every m data elements on a dimension to be sparsified of input data as valid data elements according to a sparsity rule, where m>n. In one implementation, m=4, and n=2. In other implementations, when m=4, n may also take other values, such as 1 or 3.

In some embodiments, other processing on data after sparsity is required, such as a multiplication operation, a convolution operation, and the like. It is exemplarily shown in the figure that the operation circuit 430 may further include a convolution circuit 433, which may be configured to perform a convolution operation on data that has been structurally sparsed. For example, the convolution circuit 433 may be configured to receive data to be convolved and perform the convolution operation on the data. The data to be convolved includes at least input data after sparsity received from the structured sparsity circuit 432.

Depending on different application scenarios, the sparsity circuit 432 may perform the structured sparsity according to different sparsity rules.

Figure 5A:
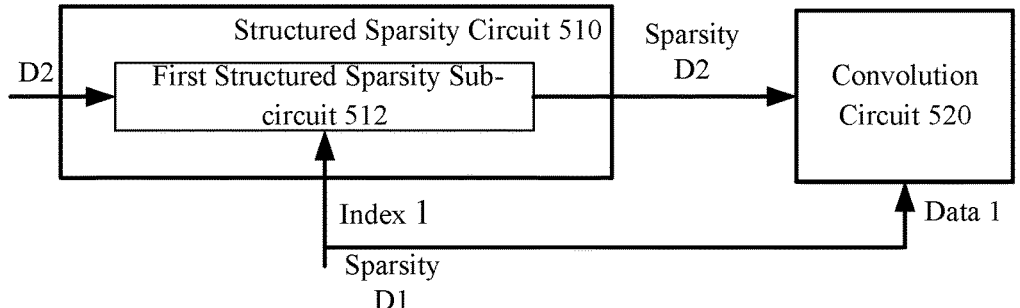
FIG. 5A-FIG. 5D are schematic diagrams illustrating partial structures of an operation circuit according to embodiments of the present disclosure.
Figure 5B:
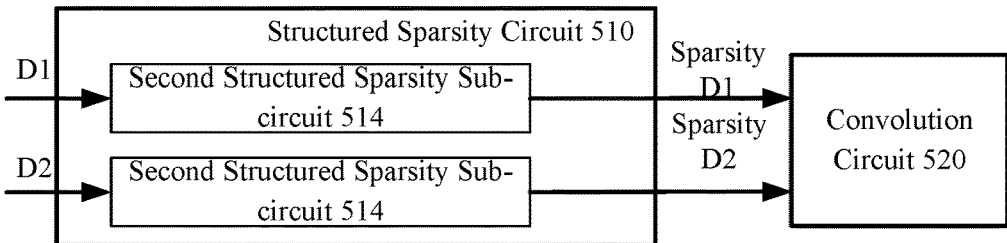
Figure 5C:
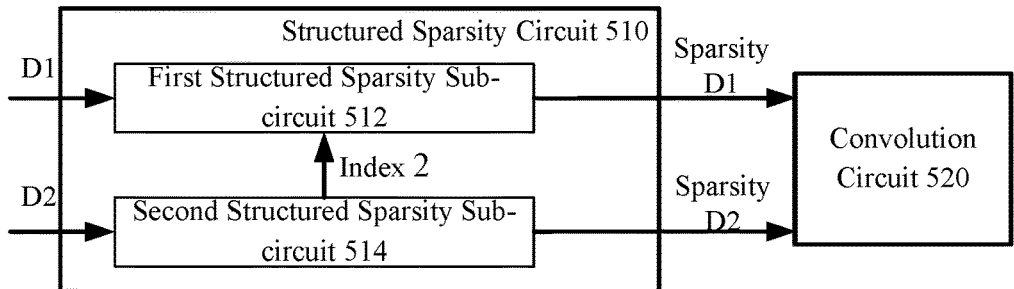

FIG. 5A-FIG. 5C are schematic diagrams illustrating partial structures of an operation circuit according to embodiments of the present disclosure. As shown in the figure, a structured sparsity circuit 510 may include a first structured sparsity sub-circuit 512 and/or a second structured sparsity sub-circuit 514. The first structured sparsity sub-circuit 512 may be configured to perform the structured sparsity on the input data according to a specified sparsity mask. The second structured sparsity sub-circuit 514 may be configured to perform the structured sparsity on the input data according to a predetermined sparsity rule. In following scenarios, it is described as an example that the convolution processing is required to be performed on the data after structured sparsity. These scenarios may occur, for example, during inference or training of the neural network.

In a first scenario, one piece of data to be convolved (assumed to be a first piece of data) may have been structurally sparsed in advance, while another piece of data to be convolved (assumed to be a second piece of data) is required to be structurally sparsed according to a sparsity method of the first piece of data.

The first scenario may be, such as an inference process of the neural network. The first piece of data is a weight, which has been structurally sparsed offline, so the sparsed weight may be directly used as a convolution input. The second piece of data is a neuron, which has not been sparsed, and is required to be structurally sparsed according to an index part obtained by sparsing the weight.

The first scenario may also be, such as a forward training process of the neural network, which is also called a forward process of training. In this scenario, the first piece of data is a weight, which has been structurally sparsed at the beginning of training. A data part and an index part obtained after the first piece of data is structurally sparsed are stored in, such as the DDR, for subsequent use when the convolution is performed on the second piece of data. The second piece of data is a neuron, which has not been sparsed, and is required to be structurally sparsed according to the index part obtained by sparsing the weight.

The first scenario may also be, such as a reverse weight gradient training process of the neural network, which is also called a reverse weight gradient process of training. In this scenario, the first piece of data is a weight, which has been sparsed during the forward training process, and may be updated directly based on the sparsed weight. The second piece of data is weight gradient, which has not been sparsed, and is required to be structurally sparsed according to an index part obtained by sparsing the weight, so as to be added to the sparsed weight to update the weight. At this time, the first structured sparsity sub-circuit may be used to perform sparsity on the second piece of data.

FIG. 5A is a partial structural schematic diagram of an operation circuit in the first scenario. As shown in the figure, in the first scenario, the structured sparsity circuit 510 may include a first structured sparsity sub-circuit 512, which receives the input second piece of data and the index part of the first piece of data that has been structurally sparsed. The first structured sparsity sub-circuit 512 takes the index part of the first piece of data as a sparsity mask to perform structured sparsity on the second piece of data. Specifically, the first structured sparsity sub-circuit 512 extracts data at a corresponding position from the first piece of data as valid data according to the position of the valid data indicated by the index part of the first piece of data. In these embodiments, the first structured sparsity sub-circuit 512 may be implemented by, such as a vector multiplication circuit or a matrix multiplication circuit. A convolution circuit 520 receives the first piece of data that has been structurally sparsed and the sparsed second piece of data output from the first structured sparsity sub-circuit 512, and performs convolution on the first piece of data and the second piece of data.

In a second scenario, neither of the two pieces of data to be convolved has not been structurally sparsed, so that it is necessary to perform structured sparsity on the two pieces of data before convolution. At this time, the second structured sparsity sub-circuit may be used to perform sparsity on the first piece of data and the second piece of data.

FIG. 5B is a partial structural schematic diagram of an operation circuit in the second scenario. As shown in the figure, in the second scenario, the structured sparsity circuit 510 may include two second structured sparsity sub-circuits 514, which respectively receive the first piece of data to be convolved and the second piece of data to be convolved, so as to simultaneously and independently perform structured sparsity on the first piece of data and the second piece of data, respectively, and output the sparsed data to the convolution circuit 520. The second structured sparsity sub-circuit 514 may be configured to perform structured sparsity according to a predetermined selecting rule. For example, the second structured sparsity sub-circuit 514 may perform structured sparsity according to a rule of selecting a large absolute value. In other words, n data elements with large absolute values are selected from every m data elements as valid data elements. In these embodiments, the second structured sparsity sub-circuit 514 may implement the above-mentioned processing by, for example, configuring a multi-stage operation pipeline composed of comparators and other circuits. Those skilled in the art may understand that the structured sparsity circuit 510 may also include only one second structured sparsity sub-circuit 514, which sequentially performs structured sparsity on the first piece of data and the second piece of data.

In a third scenario, neither of the two pieces of data to be convolved has been structurally sparsed, so that it is necessary to perform structured sparsity on the two pieces of data before convolution. One piece of data (such as the first piece of data) is required to use a sparsed index part of another piece of data (such as the second piece of data) as a sparsity mask.

The third scenario may also be, such as a forward training process of the neural network, which is also called a forward process of training. The first piece of data is a neuron, which has not been sparsed, and is required to be structurally sparsed according to an index part obtained by sparsing a weight (i.e., the second piece of data). The second piece of data is the weight, which is required to be structurally sparsed to obtain a sparsed data part and a sparsed index part. The index part is used as a sparsity mask when the first piece of data is sparsed, and the data part is used to perform a convolution operation with the sparsed first piece of data.

FIG. 5C is a partial structural schematic diagram of an operation circuit in the third scenario. As shown in the figure, in the third scenario, the structured sparsity circuit 510 may include the first structured sparsity sub-circuit 512 and the second structured sparsity sub-circuit 514. The second structured sparsity sub-circuit 514 may be configured to perform structured sparsity on, such as the second piece of data according to a predetermined selecting rule, and provide an index part of the sparsed second piece of data to the first structured sparsity sub-circuit 512. The first structured sparsity sub-circuit 512 uses the index part of the second piece of data as a sparsity mask to perform structured sparsity on the first piece of data. The convolution circuit 520 receives the first piece of data and the second piece of data that have been structurally sparsed from the first structured sparsity sub-circuit 512 and the second structured sparsity sub-circuit 514, respectively, and performs convolution on the first piece of data and the second piece of data that have been structurally sparsed.

In a fourth scenario, neither of the two pieces of data to be convolved has been structurally sparsed. Therefore, before convolution, a same sparsity mask should be applied to the two pieces of data for structured sparsity. The fourth scenario may be, such as the forward training process of the neural network, where the sparsity mask has been pre-generated and stored in, such as the DDR. The first piece of data is a neuron, which has not been sparsed, and is required to be structurally sparsed according to the sparsity mask. The second piece of data is a weight, which has not been sparsed, and is required to be structurally sparsed according to the sparsity mask.

Figure 5D:
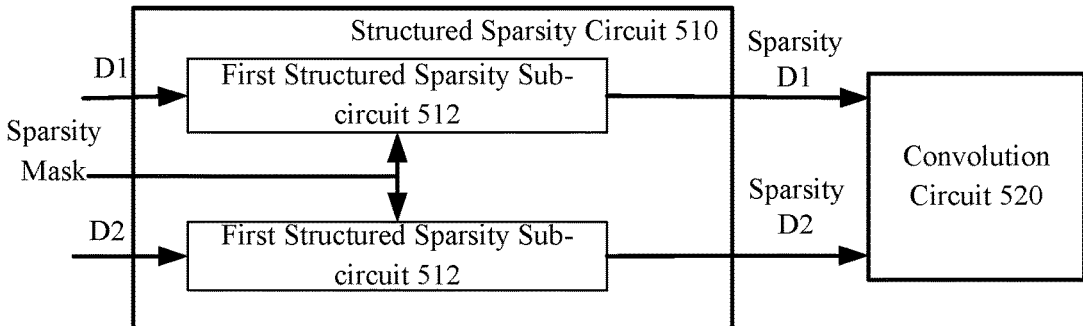

FIG. 5D is a partial structural schematic diagram of an operation circuit in the fourth scenario. As shown in the figure, in the fourth scenario, the structured sparsity circuit 510 may include two first structured sparsity sub-circuits 512, which receive the input first piece of data and the input second piece of data, respectively, and receive the pre-generated sparsity mask. The first structured sparsity sub-circuit 512 respectively performs structured sparsity on the first piece of data and the second piece of data according to the sparsity mask. The convolution circuit 520 receives the first piece of data that has been structurally sparsed and the sparsed second piece of data, and performs convolution on the first piece of data and the second piece of data.

Those skilled in the art may also consider other application scenarios and design structured sparsity circuits accordingly. For example, a same sparsity mask may be applied to two pieces of data to be convolved. In this case, the structured sparsity circuit may include two first structured sparsity sub-circuits for processing.

Figure 6:
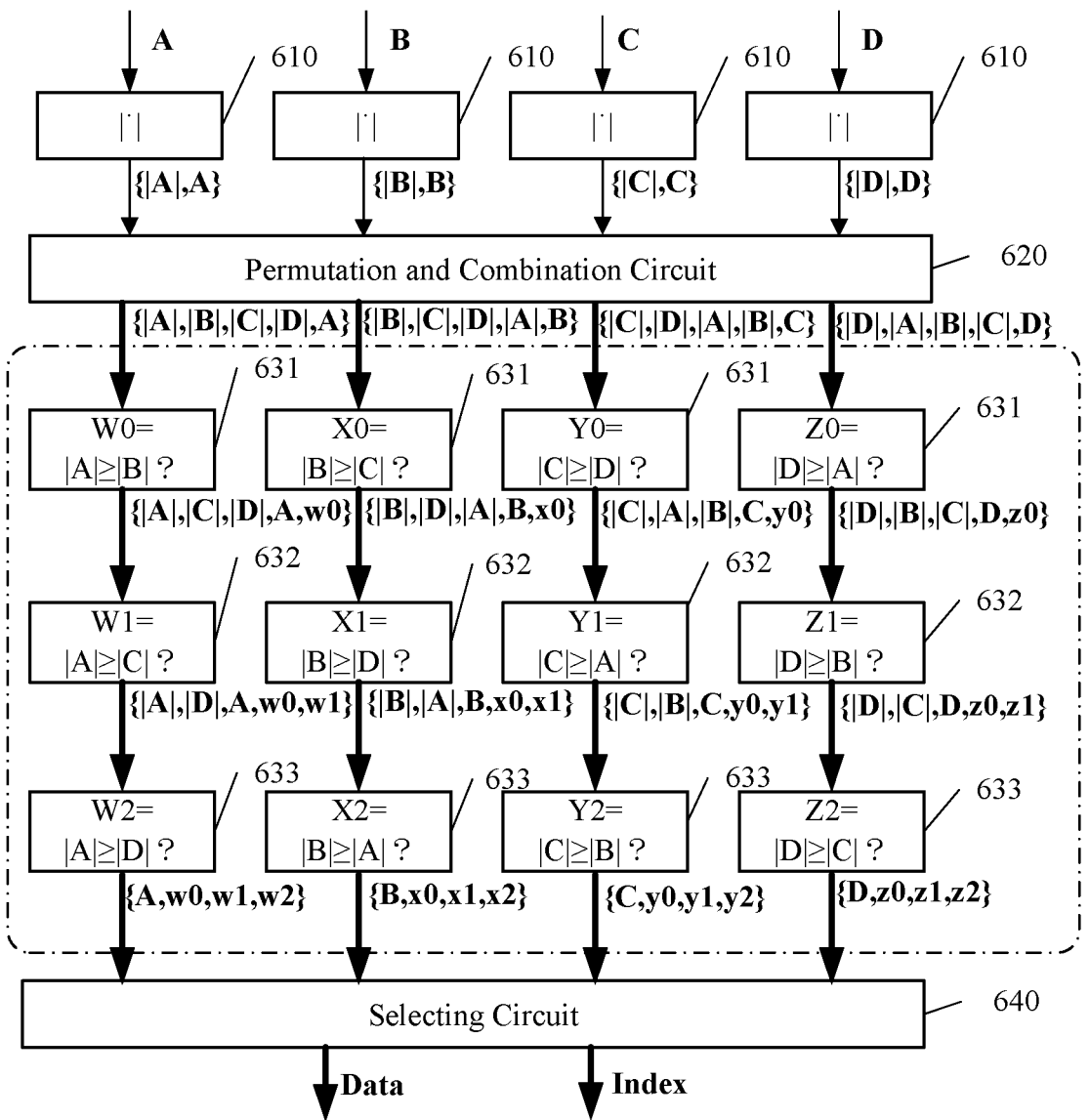
FIG. 6 illustrates an exemplary operation pipeline of structured sparsity according to an embodiment of the present disclosure.

FIG. 6 illustrates an exemplary operation pipeline of structured sparsity according to an embodiment of the present disclosure. The pipeline includes at least one multi-stage pipeline operation circuit, which includes a plurality of operators arranged stage by stage; and the multi-stage pipeline operation circuit is configured to perform structured sparsity of selecting n data elements with large absolute values from m data elements as valid data elements. For example, the pipeline may include the second structured sparsity sub-circuit for performing structured sparsity of selecting n data elements with large absolute values from m data elements as valid data elements. In an embodiment of FIG. 6, when m=4, and n=2, the second structured sparsity sub-circuit selects two data elements with large absolute values from four data elements A, B, C and D, and performs the structured sparsity on the selected data elements. As shown in the figure, the above-mentioned structured sparsity may be performed by using the multi-stage pipeline operation circuit composed of an operator of taking absolute value, a comparator, and the like.

A first pipeline stage may include m (four) operators 610 of taking absolute value for synchronously taking absolute values on the four input data elements A, B, C and D, respectively. In order to facilitate the final output of valid data elements, in some embodiments, the first pipeline stage may simultaneously output original data elements (i.e., A, B, C, and D) and data after taking absolute values (i.e., |A|, |B|, |C|, and |D|).

A second pipeline stage may include a permutation and combination circuit 620, which is used to permutate and combine m absolute values to generate m sets of data, where each set of data includes the m absolute values, and positions of these m absolute values in each set of data are different from each other.

In some embodiments, the permutation and combination circuit may be a cyclic shifter, which performs m−1 cyclic shifts on permutations of the m absolute values (such as |A|, |B|, |C| and |D|), thereby generating m sets of data. For example, in an example shown in the figure, 4 sets of data are generated, which are {|A|, |B|, |C|, |D|}, {|B|, |C|, |D|, |A|}, {|C|, |D|, |A|, |B|}, and {|D|, |A|, |B|, |C|}. Similarly, when each set of data is output, a corresponding original data element is also output, where each set of data corresponds to an original data element.

A third pipeline stage includes a comparison circuit 630 for comparing absolute values of m sets of data and generating a comparison result.

In some embodiments, the third pipeline stage may include m channels of comparison circuits, and each channel of comparison circuits includes m−1 comparators (631, 632, and 633). m−1 comparators in an i-th channel of comparison circuits are used to sequentially compare one absolute value in an i-th set of data with the other three absolute values and generate a comparison result, where $1 \leq i \leq m$.

It can be seen from the figure that the third pipeline stage may also be considered as m−1 (three) sub-stages. Each sub-pipeline stage includes m comparators for comparing a corresponding absolute value with other absolute values. The m−1 sub-pipeline stages sequentially compare a corresponding absolute value with other m−1 absolute values.

For example, in an example shown in the figure, four comparators 631 in a first sub-pipeline stage are used to compare a first absolute value and a second absolute value of the four sets of data, respectively, and output comparison results w0, x0, y0, and z0, respectively. Four comparators 632 in a second sub-pipeline stage are used to compare a first absolute value and a third absolute value of the four sets of data, respectively, and output comparison results w1, x1, y1, and z1, respectively. Four comparators 633 in a third sub-pipeline stage are used to compare a first absolute value and a fourth absolute value of the four sets of data, respectively, and output comparison results w2, x2, y2, and z2, respectively. Thus, comparison results of each absolute value with other m−1 absolute values may be obtained.

In some embodiments, the comparison results may be represented using a bitmap. For example, at a first comparator of a first channel of comparison circuits, when |A|≥|B|, w0=1; at a second comparator of the first channel of comparison circuits, when |A|≤|C|, w1=0; and at a third comparator of the first channel of comparison circuits, when |A|≥|D|, w2=1. Therefore, an output result of the first channel of comparison circuits is {A, w0, w1, w2}. At this time, the output result is {A, 1, 0, 1}. Similarly, an output result of a second channel of comparison circuits is {B, x0, x1, x2}, an output result of a third channel of comparison circuits is {C, y0, y1, y2}, and an output result of a fourth channel of comparison circuits is {D, z0, z1, z2}.

A fourth pipeline stage includes a selecting circuit 640, which is used to select n data elements with large absolute values from m data elements as valid data elements according to a comparison result of the third pipeline stage, and output the valid data elements and corresponding indexes. The indexes are used to indicate positions of these valid data elements among the input m data elements. For example, when A and C are selected from the four data elements A, B, C, and D, corresponding indexes of A and C may be 0 and 2.

According to the comparison result, appropriate logic may be designed to select n data elements with large absolute values. Considering that there may be a situation that a plurality of data elements have a same absolute value, in a further embodiment, when there are data elements with a same absolute value, the data elements are selected according to a specified order of priority. For example, according to the fixed priority of indexes from low to high, A may be set to have the highest priority, and D may be set to have the lowest priority. In an example, when the absolute values of A, C, and D are the same and greater than the absolute value of B, the selected data are A and C.

As can be seen from the above comparison result, according to w0, w1 and w2, it may be analyzed that |A| is greater than {|B|, |C|, |D|}. If w0, w1, and w2 are all 1, it means that |A| is greater than |B|, |C|, |D|, and is the maximum value among the four numbers, so that A is selected. If two of w0, w1, and w2 are 1, it means that |A| is the second largest value among the four absolute values, so that A is also selected. Otherwise, A is not selected. Therefore, in some embodiments, analysis and judgment may be made based on the occurrence times of these values.

In an implementation, valid data elements may be selected based on the following logic. First, the number of times each data is greater than other data may be counted. For example, it is defined that NA=sum_w=w0+w1+w2, NB=sum_x=x0+x1+x2, NC=sum_y=y0+y1+y2, and ND=sum_z=z0+z1+z2. Next, judgment and selection may be made according to the following conditions.

Conditions for selecting A: NA=3; or NA=2, and there is only one 3 in NB/NC/ND.

Conditions for selecting B: NB=3; or NB=2, and there is only one 3 in NA/NC/ND, and NA≠2.

Conditions for selecting C: NC=3, and there is at most one 3 in NA/NB; or NC=2, there is only one 3 in NA/NB/ND, and there is no 2 in NA/NB.

Conditions for selecting D: ND=3, and there is at most one 3 in NA/NB/NC; or ND=2, there is only one 3 in NA/NB/NC, and there is no 2 in NA/NB/NC.

Those skilled in the art may understand that, in order to ensure the selection according to a predetermined priority, there is some redundancies in the above logic. Based on the size and sequence information provided by the comparison result, those skilled in the art may design other logic to implement the selection of valid data elements, which is not limited in the present disclosure. Thus, the structured sparsity of selecting two out of four may be realized through the multi-stage pipeline operation circuit shown in FIG. 6.

Those skilled in the art may understand that other forms of pipeline operation circuits may also be designed to implement the structured sparsity, which is not limited in the present disclosure.

A sparsed result may include two parts, which are a data part and an index part. The data part includes sparsed data. In other words, the data part includes valid data elements selected according to the selecting rule of structured sparsity. The index part is used to indicate the sparsed data. In other words, the index part is used to indicate the original positions of valid data elements among the original data before sparsity (i.e., the data to be sparsed).

A variety of forms may be taken to represent and/or store the data that has been structurally sparsed. In one implementation, data that has been structurally sparsed may be in the form of a struct. In the struct, the data part and the index part are bound to each other. In some embodiments, each 1 bit in the index part may correspond to one data element. For example, when the data type is fix8, one data element is 8 bits, and each 1 bit in the index part may correspond to 8 bits of data. In some other embodiments, taking into account the subsequent implementation at the hardware level when the struct is used, each 1 bit in the index part of the struct may be set to correspond to the position of N bits of data, where N is at least partly determined based on the hardware configuration. For example, each 1 bit in the index part of the struct may be set to correspond to the position of 4 bits of data. For example, when the data type is fix8, each 2 bits in the index part may correspond to a data element of the fix8 type. In some embodiments, the data part in the struct may be aligned according to a first alignment requirement, and the index part in the struct may be aligned according to a second alignment requirement, so that the entire struct also meets an alignment requirement. For example, the data part may be aligned according to 64B, the index part may be aligned according to 32B, and the entire struct may be aligned according to 96B (64B+32B). By meeting the alignment requirement, the number of memory accesses may be reduced in subsequent use and the processing efficiency may be improved.

By using this struct, the data part and the index part may be used uniformly. During the structured sparsity, since the ratio of valid data elements to original data elements is fixed, such as n/m, the size of sparsed data is also fixed or predictable. Thus, the struct may be stored densely in the storage circuit without loss of performance.

In some other implementations, the data part and the index part obtained after the data is sparsed may also be represented and/or stored separately for separate use. For example, an index part of a second piece of input data that has been structurally sparsed may be provided to the first structured sparsity circuit 512 to be used as a mask for performing structured sparsity on a first piece of input data. At this time, in order to use a different data type, each 1 bit in a separately provided index part may indicate whether a data element is valid.

Back to FIG. 4, in some embodiments, the operation circuit 430 may further include a pre-processing circuit 431 and a post-processing circuit 434. The pre-processing circuit 431 may be configured to pre-process the data before the structured sparsity circuit 432 and/or the convolution circuit 433 performs an operation on it; and the post-processing circuit 434 may be configured to post-process data after the convolution circuit 433 performs an operation on it.

In some application scenarios, the above pre-processing and post-processing may include, such as data splitting and/or data concatenating. During the structured sparsity, the pre-processing circuit may split data to be sparsed into segments per m data elements, and then send the split data to be sparsed to the structured sparsity circuit 432 for structured sparsity. In addition, the pre-processing circuit may also control the rate of data delivery to the structured sparsity circuit. For example, in the processing involving structured sparsity, the pre-processing circuit may deliver data to the structured sparsity circuit at a first rate; while in the processing not involving structured sparsity, the pre-processing circuit may deliver data to the convolution circuit at a second rate. The first rate is greater than the second rate, and the ratio of the first rate to the second rate is, for example, equal to the sparsity ratio of structured sparsity, such as m/n. For example, in the structured sparsity of selecting two out of four, the first rate is twice the second rate. Thus, the first rate may be determined at least in part based on the processing power of the convolution circuit and the sparsity ratio of the structured sparsity. The post-processing circuit 434 may perform fusion processing on an output result of the convolution circuit, such as addition, subtraction, multiplication and other operations.

As mentioned above, data to be structurally sparsed may be data in the neural network, such as weights, neurons, and the like. Data in the neural network often contains a plurality of dimensions, and the data in the neural network is also known as tensor data. For example, in a convolutional neural network, data may have four dimensions, which are input channel, output channel, length, and width. In some embodiments, the structured sparsity described above is performed on one dimension of multi-dimension data in the neural network. Specifically, in an implementation, the above-mentioned structured sparsity may be performed during the forward process (such as inference or forward training) of the neural network. At this time, the structured sparsity is performed in an input channel dimension of the multi-dimension data in the neural network. In another implementation, the above-mentioned structured sparsity may be performed during the reverse process (such as reverse weight gradient training) of the neural network, and the structured sparsity at this time is performed on an input channel dimension of the multi-dimension data in the neural network.

It can be seen from the various application scenarios mentioned above that, for the structured sparsity of weights, the embodiments of the present disclosure provide at least two scheduling schemes.

Specifically, in an embodiment, during the forward training, the structured sparsity may be performed on the weights online in advance, and the obtained index part and data part may be directly used in the subsequent convolution process of structured sparsity with neurons. For example, in a multi-core computing apparatus consisting of layers of SoC-cluster-processor core, a task of performing structured sparsity on the weights may be split in parallel. Specifically, the task of performing structured sparsity on the weights is split from the SoC to different clusters, and split from the clusters to different processor cores for parallel execution, which may improve the execution speed. After the computation of each processor core is completed, the index part and data part generated by all processor cores are written back to the memory (such as the DDR). Then, during the forward training, the index part and data part of the weights are completely resent to different processor cores to perform operations related to the structured sparsity (such as a structured sparsity convolution operation), where the index part is used as a sparsity mask during execution, and the data part directly participates in the convolution operation. The exposed overhead of serial execution of subsequent operations (such as the convolution) may be reduced by performing structured sparsity on the weights in advance. This scheduling scheme occupies DDR space to store the data part and index part of the sparsed weights (for example, the data part and index part of the sparsed weights may be stored in the form of a struct), and there is no need to re-execute the sparsity when repeatedly loading the weights participating in the operations. When the number of repeated loading of weights is greater than 2, there may be obvious IO benefits, and there is also a large benefit in overall time overhead. Therefore, when the neurons are too large to be fully used and weights are required to be loaded repeatedly, the execution performance may be improved by adopting the scheduling scheme provided in this embodiment.

In another embodiment, the structured sparsity may be performed on the weights and neurons online during the forward training, and the sparsity mask used for the structured sparsity is pre-generated. Since the sparsity mask has a long usage period and it may be generated once for K iterations, it is not necessary to generate the sparsity mask repeatedly each time, but the sparsity mask may be cached in the DDR as an input of the structured sparsity for each iteration. In this embodiment, non-sparsed weights, non-sparsed neurons and sparsity masks required for the operations may be directly sent to each processor core, and sparsed weights and sparsed neurons directly participate in the operations. Compared with the previous embodiment, this embodiment does not need to additionally occupy the DDR to cache the sparsed weights, but directly uses the sparsed weights for subsequent operations. Therefore, when the neurons are small, for example, when the neurons are loaded at one time, there is no need to repeatedly load the weights, the execution performance may be improved by adopting the scheduling scheme provided in this embodiment.

It can be seen from the above description that the embodiments of the present disclosure provide a hardware solution for performing the processing related to structured sparsity. This structured sparsity processing may support the inference and training process of the neural network, and the structured sparsity processing may be performed on one dimension (such as an input channel dimension) of the tensor data in the neural network. By providing dedicated hardware to perform the structured sparsity, processing may be simplified, and then the processing efficiency of a machine may be improved.

According to different application scenarios, the electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with that of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It is required to be explained that for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be executed in other orders or simultaneously. Further, those skilled in the art may understand that the embodiments described in the present disclosure may be regarded as optional embodiments; in other words, actions and modules involved thereof are not necessarily required for the implementation of a certain solution or some solutions of the present disclosure. Additionally, according to different solutions, descriptions of some embodiments of the present disclosure have their own emphases. In view of this, those skilled in the art may understand that for parts that are not described in detail in a certain embodiment of the present disclosure, reference may be made to related descriptions in other embodiments.

For specific implementations, according to the present disclosure and under the teaching of the present disclosure, those skilled in the art may understand that several embodiments disclosed in the present disclosure may be implemented through other methods that are not disclosed in the present disclosure. For example, for units in the electronic device or apparatus embodiment mentioned above, the present disclosure divides the units on the basis of considering logical functions, but there may be other division methods during actual implementations. For another example, a plurality of units or components may be combined or integrated into another system, or some features or functions in the units or components may be selectively disabled. In terms of a connection among different units or components, the connection discussed above in combination with drawings may be direct or indirect coupling between the units or components. In some scenarios, the aforementioned direct or indirect coupling relates to a communication connection using an interface, where the communication interface may support electrical, optical, acoustic, magnetic, or other forms of signal transmission.

In the present disclosure, units described as separate components may or may not be physically separated. Components shown as units may or may not be physical units. The aforementioned components or units may be located in the same position or distributed to a plurality of network units. Additionally, according to actual requirements, some or all of the units may be selected to achieve purposes of the solution described in embodiments of the present disclosure. Additionally, in some scenarios, the plurality of units in the embodiments of the present disclosure may be integrated into one unit, or each of the units may be physically separated.

In some other implementation scenarios, the aforementioned integrated unit may be implemented in the form of hardware. The hardware may be a specific hardware circuit, which may include a digital circuit and/or an analog circuit. A physical implementation of a hardware structure of the circuit may include but is not limited to a physical component, and the physical component may include but is not limited to a transistor, or a memristor, and the like. In view of this, various apparatuses described in the present disclosure (such as the computing apparatus or other processing apparatus) may be implemented by an appropriate hardware processor, such as a CPU (Central Processing Unit), a GPU (Graphics Processing Unit), an FPGA (Field Programmable Gate Array), a DSP (Digital Signal Processor), and an ASIC (Application Specific Integrated Circuit). Further, the aforementioned storage unit or storage apparatus may be any appropriate storage medium (including a magnetic storage medium or a magneto-optical storage medium, and the like), such as an RRAM (resistive random access memory), a DRAM, an SRAM (static random access memory), an EDRAM (enhanced dynamic random access memory), an HBM (high bandwidth memory), an HMC (hybrid memory cube), an ROM (Read-Only Memory), and an RAM, and the like.

The foregoing may be better understood according to following articles:

A1. A data processing circuit, comprising a control circuit, a storage circuit, and an operation circuit, where the control circuit is configured to control the storage circuit and the operation circuit to perform structured sparsity on one dimension of at least one piece of tensor data;

the storage circuit is configured to store information, where the information at least includes information before and/or after sparsity; and the operation circuit is configured to perform the structured sparsity on one dimension of the tensor data under the control of the control circuit.

A2. The data processing circuit of A1, where the operation circuit includes a structured sparsity circuit, which is configured to select n data elements from every m data elements on a dimension to be sparsified of input data as valid data elements according to a sparsity rule, where m>n.

A3. The data processing circuit of A2, where the structured sparsity circuit includes: A first structured sparsity sub-circuit configured to perform the structured sparsity on the input data according to a specified sparsity mask.

A4. The data processing circuit of A2 or A3, where the structured sparsity circuit includes: a second structured sparsity sub-circuit configured to perform the structured sparsity on the input data according to a predetermined sparsity rule.

A5. The data processing circuit of A3 or A4, where the at least one piece of tensor data includes a first piece of data, and the operation circuit is configured to:

by using the first structured sparsity sub-circuit, take an index part corresponding to a second piece of data that has been structurally sparsed as a sparsity mask to perform the structured sparsity on the first piece of data, where the index part indicates positions of valid data elements to be structurally sparsed.

A6. The data processing circuit of A5, where the second piece of data that has been structurally sparsed is structurally sparsed online in advance or offline and stored in the storage circuit, or the second piece of data that has been structurally sparsed is generated online by using the second structured sparsity sub-circuit to perform the structured sparsity.

A7. The data processing circuit of A5 or A6, where the operation circuit further includes: a convolution circuit configured to perform convolution on the first piece of data and the second piece of data that have been structurally sparsed.

A8. The data processing circuit of any one of A5-A7, where the second piece of data that has been structurally sparsed is in a form of a struct, where the struct includes a data part and an index part bound to each other, where the data part includes valid data elements that have been structurally sparsed, and the index part is used to indicate a position of sparsed data before being sparsed.

A9. The data processing circuit of any one of A4-A8, where the second structured sparsity sub-circuit further includes: at least one multi-stage pipeline operation circuit, which includes a plurality of operators arranged stage by stage, and is configured to perform structured sparsity of selecting n data elements with large absolute values from m data elements as valid data elements.

A10. The data processing circuit of A9, where the multi-stage pipeline operation circuit includes four pipeline stages, where a first pipeline stage includes m operators of taking absolute value, which are used to take absolute values for m data elements to be sparsed to generate m absolute values;

a second pipeline stage includes a permutation and combination circuit, which is used to permutate and combine the m absolute values to generate m sets of data, where each set of data includes the m absolute values, and positions of these m absolute values in each set of data are different from each other;

a third pipeline stage includes m channels of comparison circuits for comparing absolute values of the m sets of data and generating a comparison result; and a fourth pipeline stage includes a selecting circuit, which is used to select n data elements with large absolute values as valid data elements according to the comparison result, and output the valid data elements and corresponding indexes, where the indexes indicate positions of the valid data elements among the m data elements.

A11. The data processing circuit of A10, where each channel of comparison circuits in the third pipeline stage includes m−1 comparators, where m−1 comparators in an i-th channel of comparison circuits are used to sequentially compare one absolute value in an i-th set of data with the other three absolute values and generate a comparison result, where $1 \leq i \leq m$.

A12. The data processing circuit of A10 or A11, where the selecting circuit is further configured to, when there are data elements with a same absolute value, select the data elements according to a specified order of priority.

A13. The data processing circuit of any one of A1-A12, where the one dimension includes an input channel dimension, and a unit of the structured sparsity is a data row of the input channel dimension of the tensor data.

A14. The data processing circuit of any one of A1-A13, where the data processing circuit is used in any of following processes:

an inference process of a neural network, a forward training process of the neural network, and a reverse weight gradient training process of the neural network.

A15. A chip, comprising the data processing circuit of any one of A1-A14.

A16. A board card, comprising the chip of A15.

A17. A data processing method using the data processing circuit of any one of A1-A14.

The embodiments of the present disclosure have been described in detail above. Specific embodiments have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

What is claimed:

1. A data processing circuit, comprising a control circuit, a storage circuit, and an operation circuit, wherein the control circuit is configured to control the storage circuit and the operation circuit to perform structured sparsity on one dimension of at least one piece of tensor data;

the storage circuit is configured to store information, wherein the information at least includes information before and/or after sparsity;

the operation circuit is configured to perform the structured sparsity on one dimension of the tensor data under the control of the control circuit;

the operation circuit includes a structured sparsity circuit configured to select n data elements from every m data elements on a dimension to be sparsified of input data as valid data elements according to a sparsity rule, wherein m>n;

the structured sparsity circuit comprises a second structured sparsity sub-circuit configured to perform the structured sparsity on the input data according to a predetermined sparsity rule;

the second structured sparsity sub-circuit further includes at least one multi-stage pipeline operation circuit, wherein the at least one multi-stage pipeline operation circuit includes a plurality of operators arranged stage by stage and is configured to perform structured sparsity of selecting n data elements with large absolute values from m data elements as valid data elements; and the multi-stage pipeline operation circuit includes four pipeline stages, wherein a first pipeline stage includes m operators of taking absolute value, which are used to take absolute values for m data elements to be sparsed to generate m absolute values;

a second pipeline stage includes a permutation and combination circuit, which is used to permutate and combine the m absolute values to generate m sets of data, wherein each set of data includes the m absolute values, and positions of these m absolute values in each set of data are different from each other;

a third pipeline stage includes m channels of comparison circuits for comparing absolute values of the m sets of data and generating a comparison result; and a fourth pipeline stage includes a selecting circuit, which is used to select n data elements with large absolute values as valid data elements according to the comparison result, and output the valid data elements and corresponding indexes, wherein the indexes indicate positions of the valid data elements among the m data elements.

2. The data processing circuit of claim 1, wherein the structured sparsity circuit includes:

a first structured sparsity sub-circuit configured to perform the structured sparsity on the input data according to a specified sparsity mask.

3. The data processing circuit of claim 2, wherein the at least one piece of tensor data includes a first piece of data, and the operation circuit is configured to:

by using the first structured sparsity sub-circuit, take an index part corresponding to a second piece of data that has been structurally sparsed as a sparsity mask to perform the structured sparsity on the first piece of data, where the index part indicates positions of valid data elements to be structurally sparsed.

4. The data processing circuit of claim 3, wherein the second piece of data that has been structurally sparsed is structurally sparsed online in advance or offline and stored in the storage circuit, or the second piece of data that has been structurally sparsed is generated online by using the second structured sparsity sub-circuit to perform the structured sparsity.

5. The data processing circuit of claim 3, wherein the operation circuit further includes:

a convolution circuit configured to perform convolution on the first piece of data and the second piece of data that have been structurally sparsed.

6. The data processing circuit of claim 3, wherein the second piece of data that has been structurally sparsed is in a form of a struct, wherein the struct includes a data part and an index part bound to each other, wherein the data part includes valid data elements that have been structurally sparsed, and the index part is used to indicate a position of sparsed data before being sparsed.

7. The data processing circuit of claim 1, wherein each channel of comparison circuits in the third pipeline stage includes m−1 comparators, wherein m−1 comparators in an i-th channel of comparison circuits are used to sequentially compare one absolute value in an i-th set of data with the other three absolute values and generate a comparison result, wherein 1≤i≤m.

8. The data processing circuit of claim 1, wherein the selecting circuit is further configured to, when there are data elements with a same absolute value, select the data elements according to a specified order of priority.

9. The data processing circuit of claim 1, wherein the one dimension includes an input channel dimension, and a unit of the structured sparsity is a data row of the input channel dimension of the tensor data.

10. The data processing circuit of claim 1, wherein the data processing circuit is used in any of following processes:

an inference process of a neural network, a forward training process of the neural network, and a reverse weight gradient training process of the neural network.

* * * * *